(12) United States Patent
Feier

(10) Patent No.: US 9,858,765 B2
(45) Date of Patent: Jan. 2, 2018

(54) SIMULATING RACE EVENTS ACCORDING TO BETTING INFORMATION

(71) Applicant: Horse Place Ltd., Road Town (VG)

(72) Inventor: Zafrir Feier, Tel-Aviv (IL)

(73) Assignee: Horse Place Ltd., Road Town (VG)

( * ) Notice: Subject to any disclaimer, the term of this patent is extended or adjusted under 35 U.S.C. 154(b) by 0 days.

(21) Appl. No.: 15/140,591

(22) Filed: Apr. 28, 2016

(65) Prior Publication Data

US 2017/0109975 A1 Apr. 20, 2017

Related U.S. Application Data

(60) Provisional application No. 62/243,086, filed on Oct. 18, 2015.

(51) Int. Cl.
| | |
|---|---|
| *A63F 13/00* | (2014.01) |
| *G07F 17/32* | (2006.01) |
| *A63F 13/57* | (2014.01) |
| *A63F 13/25* | (2014.01) |
| *A63F 13/45* | (2014.01) |

(52) U.S. Cl.
CPC .......... *G07F 17/3288* (2013.01); *A63F 13/25* (2014.09); *A63F 13/45* (2014.09); *A63F 13/57* (2014.09)

(58) Field of Classification Search
CPC .................................. A63F 3/0434; A63F 9/24
See application file for complete search history.

(56) References Cited

U.S. PATENT DOCUMENTS

| | | | | |
|---|---|---|---|---|
| 5,888,136 A * | 3/1999 | Herbert | ................... | G07F 17/32 463/22 |
| 6,080,063 A * | 6/2000 | Khosla | ................... | A63F 13/10 463/42 |
| 6,152,822 A * | 11/2000 | Herbert | ................... | G07F 17/32 463/16 |
| 7,306,514 B2 * | 12/2007 | Amaitis | ................... | G07F 17/32 273/237 |
| 8,142,279 B2 * | 3/2012 | Benrus | ................... | G07F 17/32 463/25 |
| 8,210,926 B2 * | 7/2012 | Asher | ................... | G06Q 40/04 463/25 |
| 8,888,584 B2 * | 11/2014 | Cohen | ................... | A63F 13/12 463/25 |
| 9,317,999 B2 * | 4/2016 | Fine | ................... | G07F 17/3244 |
| 2001/0034268 A1 * | 10/2001 | Thomas | ................. | G06Q 50/34 463/40 |
| 2003/0078087 A1 * | 4/2003 | Kojima | ................... | G07F 17/32 463/6 |

(Continued)

*Primary Examiner* — Milap Shah
*Assistant Examiner* — Malina D Blaise

(57) ABSTRACT

A computer implemented method of performing an animated simulation display of a race event, comprising:
1) Acquiring betting information of a plurality of participants of the race event.
2) Acquiring a plurality of results of the race event.
3) Calculating a plurality of order change events determined by the betting information and the results.
4) Instructing a presentation of an animated simulation on a display of a plurality of animated objects according to the plurality of order change events, wherein each of the animated objects represents one of the plurality of participants in the race event.

18 Claims, 15 Drawing Sheets

(56) References Cited

U.S. PATENT DOCUMENTS

| | | | |
|---|---|---|---|
| 2003/0087683 A1* | 5/2003 | Gatto | G06Q 50/34 463/6 |
| 2003/0212623 A1* | 11/2003 | Aylmer | G06Q 40/04 705/37 |
| 2006/0281508 A1* | 12/2006 | Carney | A63F 13/10 463/6 |
| 2007/0060322 A1* | 3/2007 | Benrus | G07F 17/3288 463/28 |
| 2008/0139316 A1* | 6/2008 | He | G06Q 10/00 463/42 |
| 2008/0268930 A1* | 10/2008 | Miller | A63F 13/10 463/6 |
| 2009/0149233 A1* | 6/2009 | Strause | G06Q 50/34 463/7 |
| 2013/0079094 A1* | 3/2013 | Odom | G07F 17/3288 463/17 |
| 2013/0260847 A1* | 10/2013 | Amaitis | G07F 17/3276 463/6 |
| 2015/0364009 A1* | 12/2015 | Keech | G07F 17/3225 463/28 |
| 2016/0098900 A1* | 4/2016 | Benrus | G06Q 50/34 463/22 |

* cited by examiner

```
            <"DOCTYPE HorseRace SYSTEM "HorseRace.dtt!>
            <HorseRacing timestamp="20131027T164541+0000">      <--501
502-->      <Meeting course="HoweyDowns" date="20131027" status="Dormant"
            country="Australia" id="44434" revision="4">
            <Weather>Light Rain Showers</Weather>
            <Going brief="Good">Good (Good to Soft in places)</Going>
            <Race date="20131027" status="WeighedIn" id="487" revision="52"
            stewards="ResultStands" trifecta="Yes" showcase="No" handicap="No" runners="7"    <--503
            time="1620+0000">
            <Weather>Light Rain Showers</Weather>
            <Going brief="Good">Good (Good to Soft in places)</Going>
            <OffTime date="20131027" time="162314+0000"/>
            <WinTime time="0410.90"/>
            <Stewards>
            <Inquiry>Result Stands</Inquiry>
            </Stewards>
            <BetMarket deductionType="None" deduction="0" dtFormed="20131027T161100+0000"
            marketNumber="1"/>
```

FIG. 5

```
            <Horse status="Runner" id="1937042" bred="IRE" name="Ocean Cookie">   <--601
602-->      <Cloth number="6"/>
            <Weight text="11st 0lbs" value="154" units="lbs"/>
            <Jockey id="7299" name="A B McMinimouse"/>
            <Trainer id="1578" name=" Alleycat McMalley "/>
            <Show timestamp="20131027T161100+0000" marketNumber="1">
            <Price denominator="4" numerator="6"/>
            </Show>
            <Show timestamp="20131027T161402+0000" marketNumber="1">
            <Price denominator="8" numerator="11"/>
            </Show>
            <Show timestamp="20131027T161939+0000" marketNumber="1">
            <Price denominator="8" numerator="11"/>
            </Show>
            <StartingPrice>
            <Price denominator="8" numerator="11"/>   <--603
            <Favourite joint="1" position="1"/>
            </StartingPrice>
            <Result disqualified="No" finishPos="1"/>   <--604
```

FIG. 6

SIMULATING RACE EVENTS ACCORDING TO BETTING INFORMATION

RELATED APPLICATION

This application claims the benefit of priority under 35 USC 119(e) of U.S. Provisional Patent Application No. 62/243,086 filed Oct. 18, 2015, the contents of which are incorporated herein by reference in their entirety.

BACKGROUND

The present invention, in some embodiments thereof, relates to an animated simulation of a race with a plurality of participants and, more specifically, but not exclusively, to an animated simulation of a race with a plurality of participants based on non-visual data.

Simulations of racing events exists in prior art in various forms. Computer gaming is an interactive form of race simulation, wherein the person or persons playing the game has a degree of control over the outcome. Some computer simulated race games allow players to control multiple aspects of the race environment, including breeding virtual horses and selecting virtual jockeys. The results of computer simulated races are usually pre-determined before the simulation is displayed and sometimes determined in real time during the display of the simulation. In either case, the results are entirely determined by a computer program. Computer simulations of races are a form of fantasy game, where the results are fictional, and not based on the results of an actual race event involving real horses that competed with each other.

A major economic motivation in the creation of computer simulated races is the opportunity to profit from offering public betting on the outcome of the simulation. However, actual real world races consistently generate significantly greater volume of betting commerce compared to computer simulated races. A number of factors cumulatively make computer simulated races less attractive to the betting public. The main factor that makes computer simulated races less attractive to the betting public is the fact that the computer simulated races are fictional events, with results determined by computers.

SUMMARY

According to some embodiments of the present invention, there is provided a method for performing an animated simulation display of a race event comprising acquiring betting information of a plurality of participants of a race event, acquiring a plurality of results of the race event, calculating a plurality of order change events determined by the betting information and the results, instructing a presentation of an animated simulation on a display of a plurality of animated objects according to the plurality of order change events, each of the animated object represents one of the plurality of participants in the race event.

Optionally, the results comprise the order of arrival of the participants at a finish line of the race event.

Optionally, the animated simulation comprises a graphical representation of a race course comprising a beginning point, an ending point, and a path from the beginning point to the ending point, wherein at least some of the plurality of animated objects begin the animated simulation at the beginning point, follow the path, and arrive at the ending point at the end of the animated simulation.

Optionally, the order change event defines a location of each of the animated object relative to every other of the animated objects and relative to the ending point.

Optionally, the order change events are indexed in an array, wherein the order change events are displayed sequentially according to the index.

Optionally, the betting information comprises betting odds on at least one of the plurality of participants, the betting odds are acquired via a network from at least one server of a member of a group consisting of: a bookmaker, a race event establishment, and other betting exchanges.

Optionally, the betting information further comprises at least one of para-mutual odds and fixed odds.

Optionally, the betting information comprises a plurality of transactions wherein payment is accepted in exchange for a promise of a compensation conditioned on performance of at least one of the plurality of participants in the race event.

Optionally, the race event is a horse race wherein the betting information comprises horse race betting odds on the race participants in the race event, comprising odds for win, place, show, across the board, trifecta, trifecta box, trifecta key, exacta, exacta box, superfecta, superfecta box, superfecta key, or any other type of horse race betting odds.

Optionally, the order change event is calculated responsive to a data element comprising a random variable.

Optionally, the order change event is calculated responsive to a data element comprising a point in time within a duration of the simulation.

Optionally, the order change event is calculated responsive to a location of the participant in the race event relative to the plurality of participants and relative to the finishing line in the race event.

Optionally, the order change event is calculated responsive to at least one of the following: a number of the participants, and a length of time of the race event.

Optionally, the race event is a horse race and the order change event is calculated responsive to a data element comprising handicap data for the participants.

According to some embodiments of the present invention, there is provided a system for performing an animated simulation display of a race event, comprising a server comprising an interface adapted to acquiring betting information of a plurality of participants of a race event, the server interface adapted to acquiring a plurality of results of the race event, at least one processor, a memory hosting code wherein the code is implementable by at least one processor for calculating instructions to update a plurality of order change events according to the betting information and the results, the server interface adapted to send to a browser or an application running on a client instructions to render a presentation of an animated simulation on a display of a plurality of animated objects according to the plurality of order change events, each of the animated object represents one of the plurality of participants in the race event.

Optionally, the results comprise the order of arrival of the participants at a finish line of the race event.

Optionally, the order change event defines a location of each of the animated object relative to every other of the animated objects and relative to the ending point.

Optionally, the betting information comprises betting odds on at least one of the plurality of participants, the betting odds are acquired via a network from at least one server of a member of a group consisting of: a bookmaker, a race event establishment, and other betting exchanges.

According to some embodiments of the present invention, there is provided a computer program product for computing a simulation of a race event, the computer program product comprising one or more non-transitory computer-readable storage mediums and program instructions stored on at least one of the one or more storage mediums, the program instructions comprising program instructions for receiving a plurality of data elements from networked servers and data bases, program instructions for analyzing the plurality of data elements and associating the data elements with animated objects, program instructions for calculating a plurality of order change events, program instructions for instructing the presentation of an animated display, program instructions for transmitting the instructions via a computer network to client programs, and program instructions in the client programs to display the animation on the display.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 5 is an exemplary set of data in xml format supplied by a betting information server referring to a specific race event, according to some embodiments of the present invention;

FIG. 6 is an exemplary set of data in Extensible Markup Language (XML) format supplied by a betting information server referring to a single specific race event participant in a specific race event, according to some embodiments of the present invention;

DETAILED DESCRIPTION

Figure 1:
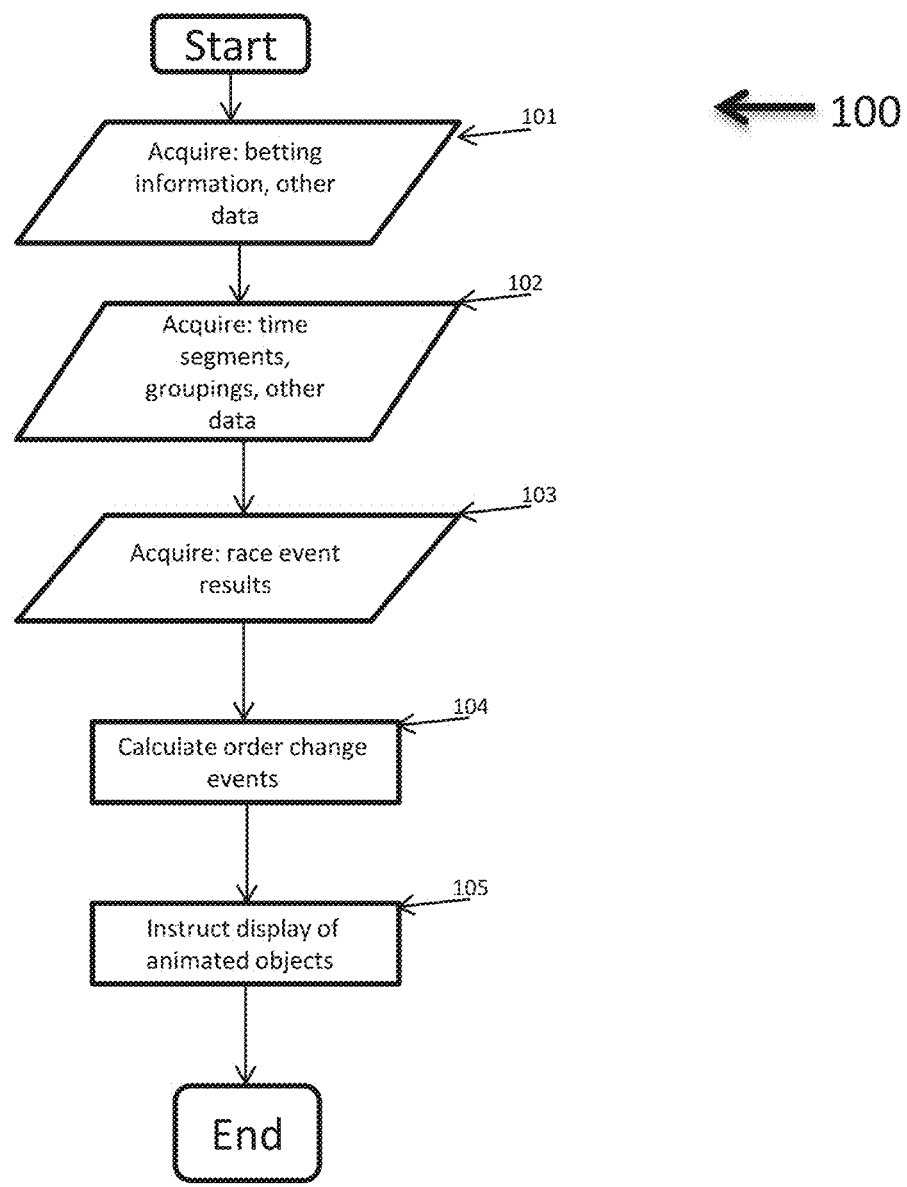
FIG. 1 is a flowchart of a method of generating and displaying a simulation of a race event, according to some embodiments of the present invention.

The present invention, in some embodiments thereof, relates to presenting an animated simulation of race events that occur at actual race tracks around the world, and more specifically, but not exclusively, to ordering of representations of the race participants according to betting information. Each race simulation presents an animated representation of a single specific actual race, wherein the number of actual race participants, the names of the actual race participants, and the final results of the actual race are all accurately displayed in the simulation. Further, the simulation can be generated and displayed virtually immediately after the conclusion of the actual race event that is being simulated.

The presentation may be generated without using video data and/or imaging data from the actual specific real world race, referred to herein as the race event.

According to some embodiments of the present invention, there are provided methods and systems for updating an order change event of graphical and/or animated renderings of race participants, hereafter referred to as "animated objects". As used herein, order change events means determining the location of animated objects relative to other animated objects and relative to the finish line of the virtual race, as computed by the execution of an ordering function. As used herein, an ordering function is a function which when executed calculates the order change events of animated objects based on betting information, the results of the race event, and other data.

The present invention, in some embodiments thereof, may present a simulation of any race event wherein information is obtainable for ranking the participants. The information for ranking the participants may comprise betting information, handicap information, past performance of participants in race events, opinion polls, and/or any other form of ranking data. As such the present invention may be used to simulate horse race events comprising flat races, harness races, trot races, thoroughbred races, steeplechase races, and/or any other type of horse race. As such, the present invention may be used to simulate other types of race event, comprising motorsport races, dog races, foot races, swimming races, cycling races, ski races, and/or any other race event.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1 which is a flowchart 100 of a method of generating and displaying a simulation of a race event based on betting information. In 101 of FIG. 1 a single specific real world race event is specified for a single specific simulation. Data regarding the specific race event is optionally acquired from one or more servers network. During the course of the simulation, the animated objects are automatically ordered according to betting odds, and at a conclusion of the simulation a simulation of winning by some of the animated objects represents the winning participants of the actual race event. In addition to betting information, final results of the race event and optionally other data elements, such as random variables, handicap data, and/or performance of race participants during the race event, are utilized as inputs to generate the simulation. Handicapping, as it relates to horse races, is the practice of predicting which horses who have the greatest chance of winning a race. Many race tracks have professional handicappers that offer predictions on which horse is likely to win. Handicap data comprises one or more handicapping predictions from race establishments regarding specific race event participants.

Figure 13:
FIG. 13 is an exemplary view of a display of the results of an animated race simulation, according to some embodiments of the present invention.
Figure 15:
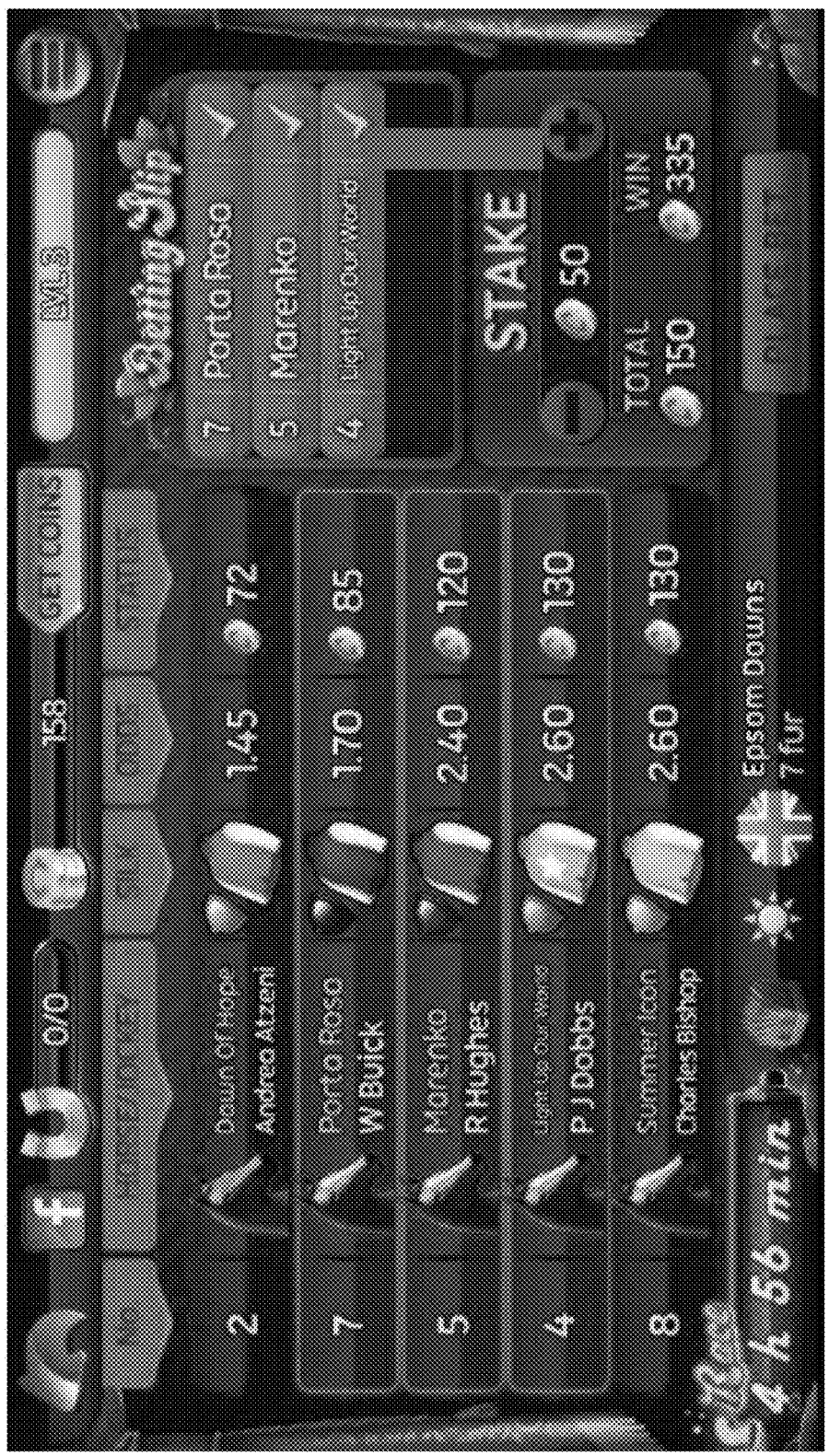
FIG. 15 is an exemplary view of a display of betting odds offered for an animated race simulation, according to some embodiments of the present invention.

Reference is now made to FIG. 13 which is an exemplary view of a display of the results of an animated race simulation. Reference is now made to FIG. 15 which is an exemplary view of a display of betting odds offered for an animated race simulation.

The display creates a viewer experience similar to the experience of viewing an actual imaging of a race event. The significant aspects of viewing a race event comprise: anticipation of the start of the race event wherein all the participants are at the starting line, the initial excitement of the start of the race event, wherein the pack of participants begin to spread out with frontrunners and laggards, the visual and cognitive simulation of keeping track of multiple participants and their relative advancement towards the finish line, the tension near the end of the race event wherein a small number of participants could all potentially be the winner, and the resolution of that tension when the race event concludes and the results are known. As explained below, all of the significant aspects of the viewing experience may be simulated by the present invention.

Figure 14:
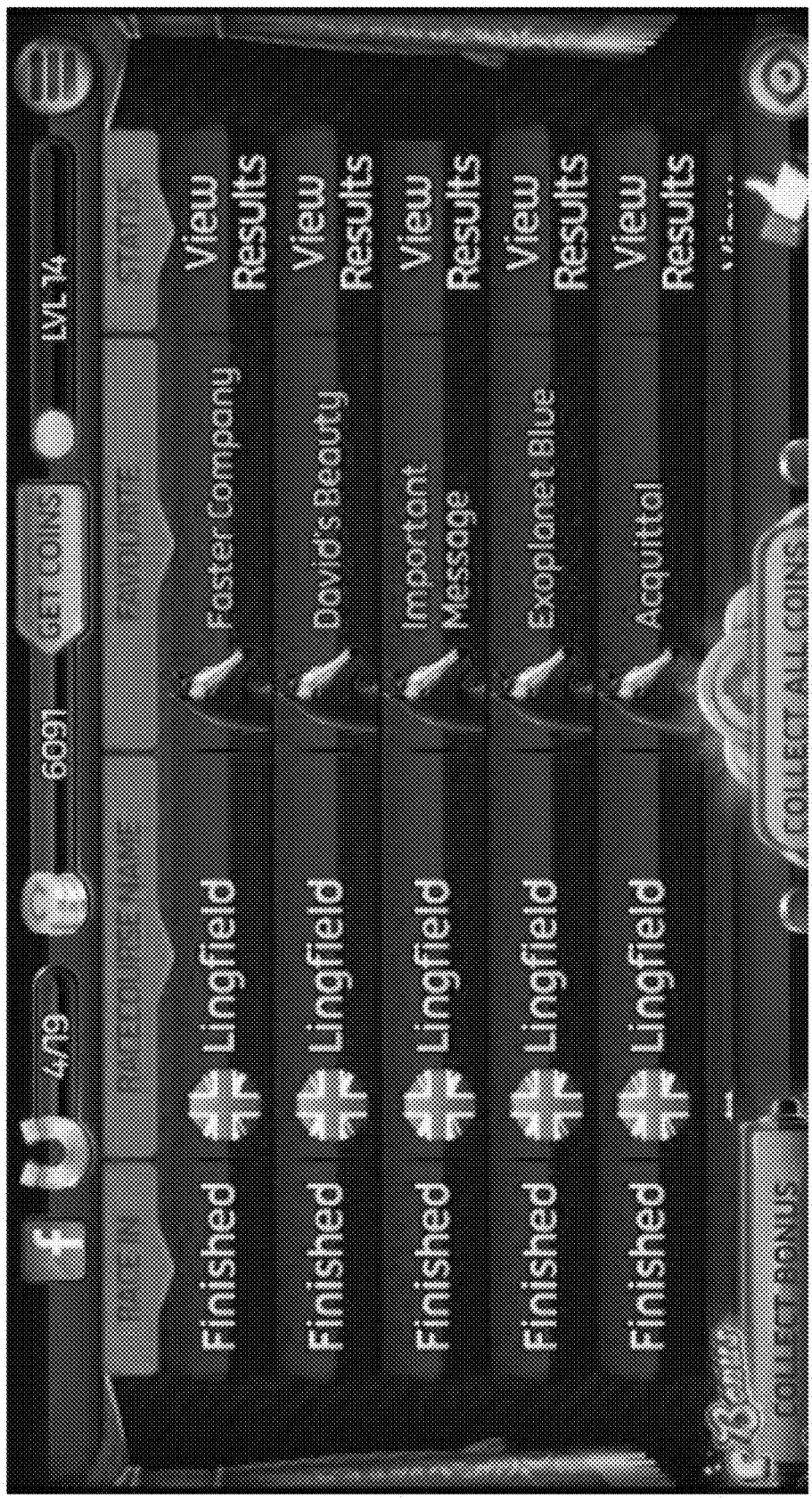
FIG. 14 is an exemplary view of a display of a list of animated race simulations, according to some embodiments of the present invention.

The present invention, in some embodiments thereof, may present historical results of animated race simulations. Reference is now made to FIG. 14 which is an exemplary view of a display of results of historical animated race simulations.

Figure 3:
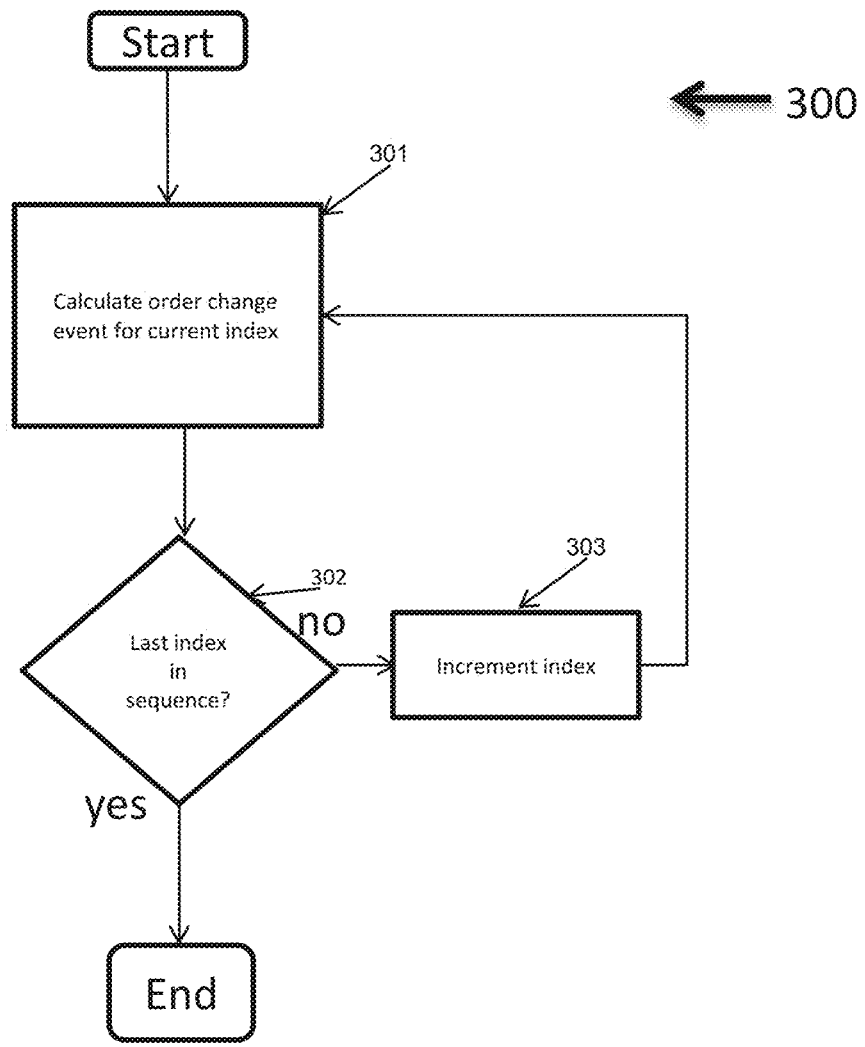
FIG. 3 is a flowchart of a method of calculating the order of the animated objects in said simulation, according to some embodiments of the present invention.

Reference is also made to FIG. 3 which is a flowchart 300 of a method of ordering based on a function executed to calculate order change events of animated objects according to betting information and optionally other data elements, according to some embodiments of the present invention. As shown in 300, the ordering function when executed may generate an ordered list of order change events in a dataset such as an index and store the order change events sequentially in an array according to the dataset.

Figure 2A:
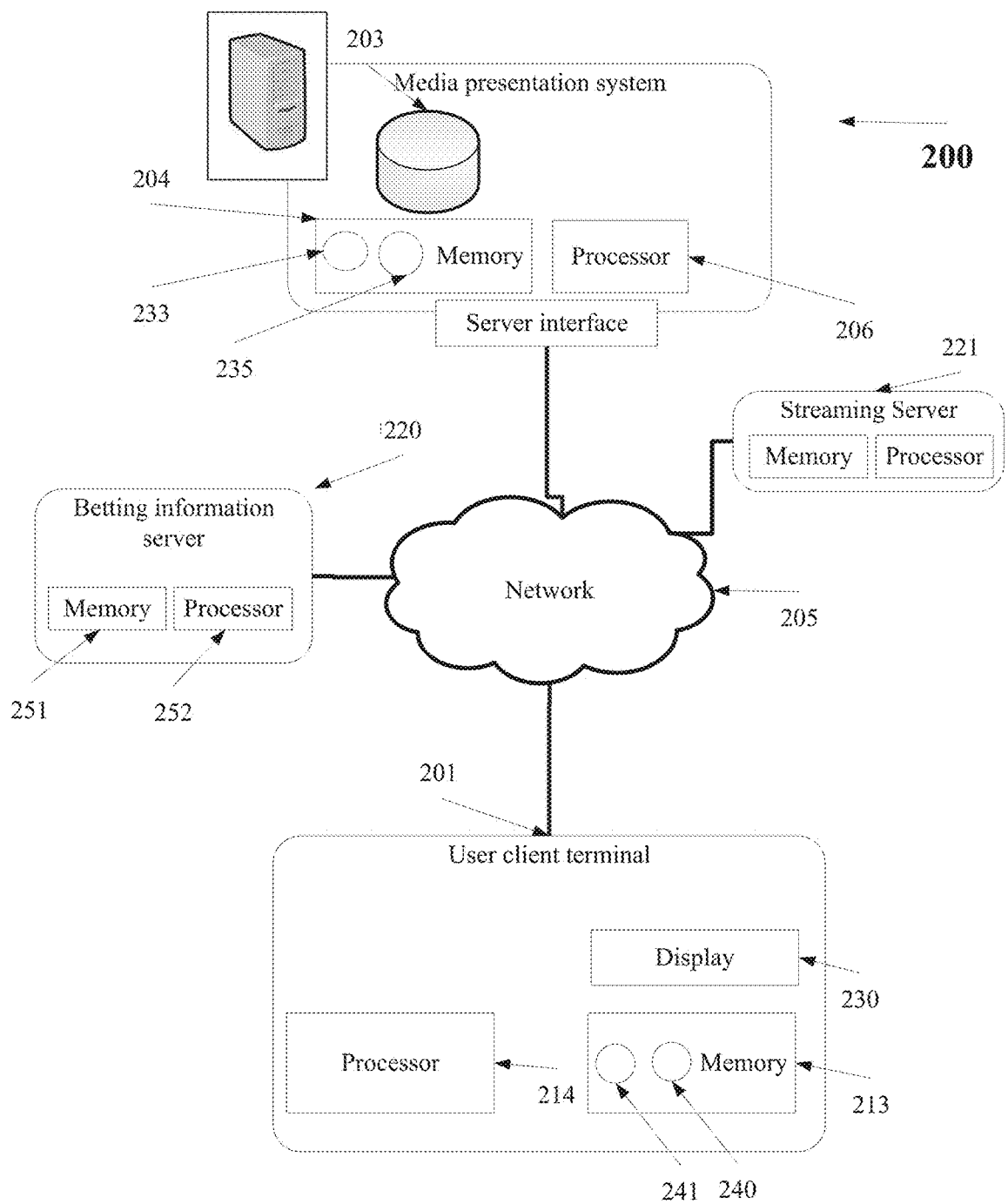
FIGS. 2A and 2B are schematic illustrations of systems for implementing a method of generating and displaying a simulation of a race event, according to some embodiments of the present invention.

As shown in 301, the ordering function when executed calculates order change events for every entry in the array. As shown in 302, the ordering function when executed calculates whether the current index is the last index in the sequence. When the current index is the last index in the sequence, the ordering function when executed has completed calculating order change events. As shown in 303, the ordering function when executed increments the index and proceeds to calculate the next order change event, as shown in 301. As shown in 103, the calculation of order change events, as shown in 301, may commence as soon as results of the race event are delivered to the ordering function when executed. As shown in FIG. 2A, a betting information server 220 may provide race event results via network 205 to the ordering function when executed. The results of the race event may be delivered in real time as soon as the race event has concluded.

Race events are contests between race participants to determine one or more winning race participants. The one or more winners are the race participant(s) which traveled the length of the race course from beginning to end and arrive at the end of the race course ahead of other race event participants. While race events are sporting competitions and as such are entertainment events, a main factor in the commercial success of race events is often betting on which participant(s) will win. The results of race events are often public knowledge once the race has concluded; however, the visual data documenting the race event, for example photos and video files, is usually a private property which is available to an operator of cameras at the premises of the race event. While results of a race event are sufficient to determine which bets pays out and which not, many betters strongly prefer to bet on race events that they can watch. In order to encourage betting on race events without use of restricted visual data, the present invention, in some embodiments thereof, offers processes and systems to visually simulate a race event based on betting information and other data.

Two major limitations shared by existing computer race games and race simulations are they do not represent the events of a race event, and in the case where they do represent a race event, they are not available for viewing immediately after the race event has concluded. The present invention, in some embodiments thereof, provides a simulation of a race event that both represents a race event and is available for viewing immediately after the race event concludes.

Many race events have relatively short durations, often one minute or less. The present invention, in some embodiments thereof, allows broadcast streaming of the simulation immediately after the race event has concluded. Due to the relatively short lag time between the start of the race event and the start of the simulation, the simulation may provide the illusion of a real-time presentation of the race event.

Figure 8:
FIG. 8 is an exemplary view of an animated race simulation on a handheld client terminal display, according to some embodiments of the present invention.

Reference is also made to FIG. 2A, which is a schematic illustration of system 200 for implementing a method of updating order change events of animated objects, for example as depicted in FIG. 1, according to some embodiments of the present invention. The schematic illustration depicts the system and a client terminal 201 comprising a graphical user interface (GUI) that is used for displaying the simulation, according to some embodiments of the present invention. As used herein a client terminal means a device which presents the GUI, for example a laptop, a desktop, Smart glasses, a smart watch, a tablet, a wearable device and/or the like. Reference is now made to FIG. 8, an exemplary view of a handheld client terminal with a display of an exemplary animated race simulation.

The media presentation system 200 may be implemented by one or more network nodes connected to a network 205 such as the internet, for example one or more servers, virtual machines (VMs) and/or the like. The GUI is optionally an interactive user interface (UI) rendered or otherwise displayed on a screen 230 of the client terminal, for instance by a browser executed on the client terminal. The client terminal 201 includes processor(s) 214 and a memory unit 213 for supporting the presentation of the GUI, for example by executing a browser, an add-on, and/or an application loading and rendering the GUI.

The media presentation system 200 includes one or more processors 206 and a memory 204 for storing instructions for implementing an ordering function contained in ordering module 233 as depicted in 104. The instructions for executing a the ordering function, implemented as a software code executed by processor(s) 214 and referred to herein as an ordering module 233, may be divided between a number of units, for example different servers on the network 205 and/or between the media presentation system 200 and the client terminal 201.

As shown in 105, stored in memory 204 are instructions for executing an encoder 235 which generates a digital version of the simulation suitable for transport over the network 205. The encoder 235 may create one or more files comprising digital audio, digital video, and/or vector graphics. The digital video may be Flash Video (FLV), Graphics Interchange Format (GIF), Portable Network Graphics (PNG), Motion Pictures Experts Group-4 (MPEG-4) and/or any other format of digital video. The vector graphics file may be Computer Graphics Metafile (CGM), Gerber format, Scalable Vector Graphics (SVG) or any other format of vector graphics file. The digital audio may be any variety of Pulse Code Modulation (PCM) and/or any other audio format.

The digital media may be compressed with loss of data to reduce latency during transport, or without loss of data to maximize sound and video quality. The digitized audio and video instructions may be combined into a metafile, also known as a container file. The container file is suitable for downloading, and/or for streaming. In the event that the file is streamed, the streaming file may be suitable for live streaming, and/or on-demand streaming. The streaming may be uni-cast and/or multi-cast. The streaming may be constant bitrate and/or adaptive bitrate, or any other bitrate scheme. The media presentation system 200 may serve as a streaming server, and/or may transfer the streaming file to a streaming server 221 connected to network 205. The streaming file may be delivered from a streaming server to a streaming client 241 located in memory 213 using a transport protocol, such as Microsoft Media Server (MMS) or Real Time Protocol (RTP) or any other transport protocol. If adaptive bitrate technology is used, Hypertext Transport Protocol (HTTP) Live Streaming (HLS), Smooth Streaming, HTTP Dynamic Streaming (HDS) Dynamic Adaptive Streaming over HTTP (MPEG-DASH) and/or any other protocol that supports adaptive bitrates may be used. The streaming client may interact with the streaming server using a control protocol, such as Multimedia Messaging Service (MMS) and/or Real Time Streaming Protocol (RTSP) or any other streaming control protocol.

The system media presentation system 200 may include and/or be connected to one or more databases 203 which store data elements, comprising records and/or links, related to race participants, race events, animated objects, and data related to simulations of race events.

Figure 2B:
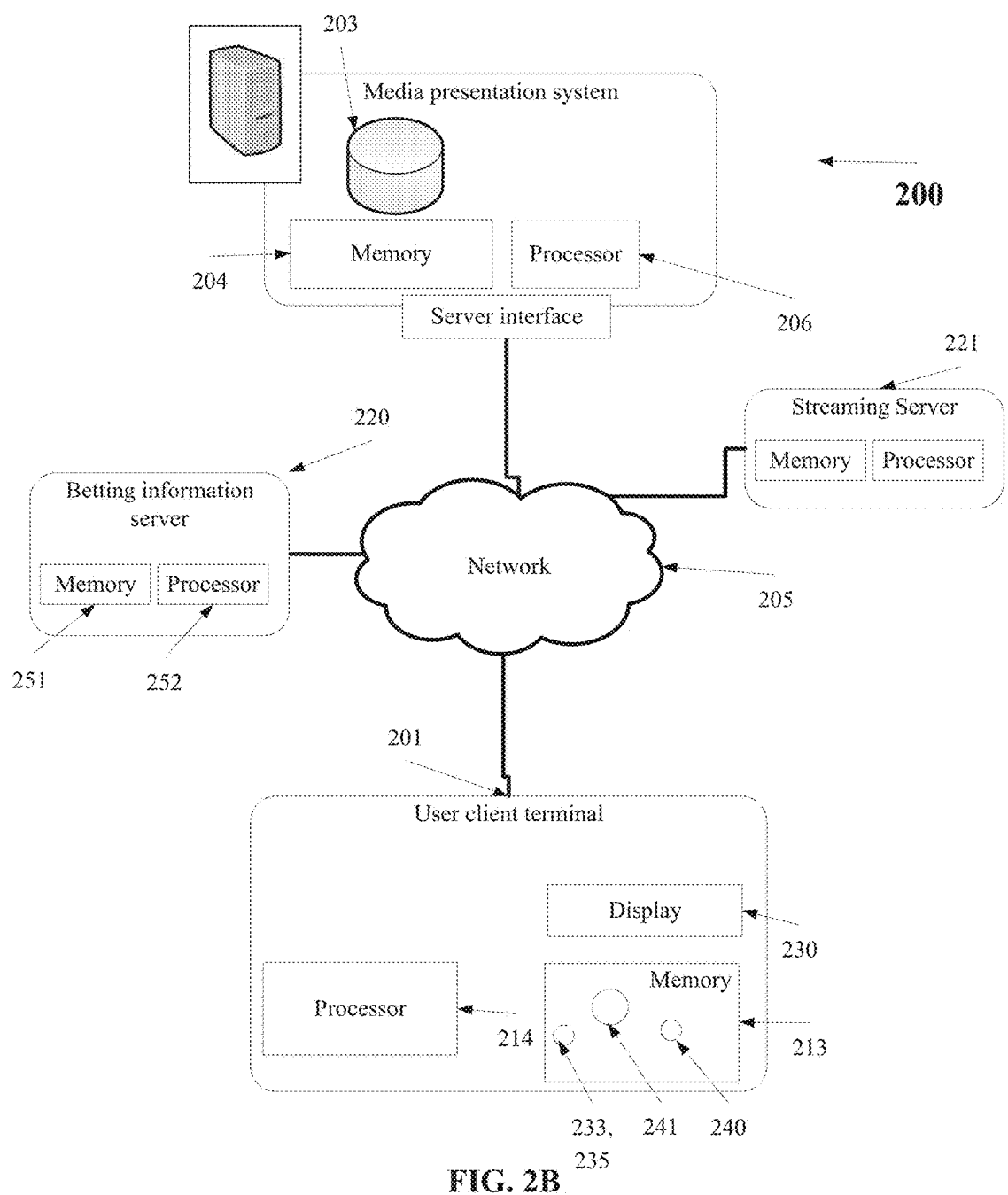

According to some embodiments of the present invention, for example as depicted in FIG. 2B, the ordering module 233 and encoder 235 may be executed by the processors of the user client terminal 201. In such embodiments the animated objects and/or indications thereof are forwarded to the client terminal 201 for ordering by the ordering module 233 and encoder 235. In such a manner, the size of the digital media file transferred to the client is reduced, thereby reducing transport latency.

The decoder 240 and may be a code and/or a script and/or a browser extension and/or a plug-in loaded with a webpage, such as a search engine webpage and/or an entertainment webpage and/or a code running by an application installed at the client terminal 235. The application may be downloaded from an application store and/or temporarily installed as a widget in an accessed webpage.

Reference is now made to FIG. 5, which is an exemplary set of data in Extensible Markup Language (XML) format supplied by a betting information server referring to a specific race event. As shown in 501, the date and time of the race event are supplied. As shown in 502, the name of the race event setting is supplied. As shown in 503, the number of race event participants is supplied.

Reference is now made to FIG. 6, which is an exemplary set of data in XML format supplied by a betting information server referring to a single specific race event participant in a specific race event. As shown in 601, the name of the race event participant is supplied. As shown in 602, the identifying number of the race event participant is provided. As shown in 603, the betting odds for the specific race participant are supplied. As shown in 604, the final result for the specific race participant is supplied, in the form a number rank wherein "1" represents the race participant to first cross the finish line.

As shown at 101, the media presentation system 200 acquires betting information from a betting information server 220 comprising betting information, the names and identifying numbers of participants, the number of participants, the name of the race event, the date and time of the race event, and optionally after the race event has begun, betting data for participants during the race event.

Optionally, betting information assigned to some or all animated objects may correspond to betting odds offered by a betting exchange, bookie, and/or any other forum and/or business that accepts bets on race events, for example the betting odds of various horses competing in a horse race.

As shown at 102, the ordering module 233 retrieves from databases 203 data elements related to the organization of the simulation of a race event. The data elements may comprise: the number and length of time segments, the number of groupings, number of frontrunners, and the total time of the simulation.

As used herein, the phrase "time segment" means a subset the total length of time of the simulation. The ordering function when executed may divide the length of the simulation into two or more time segments. Typically, for a 60 second horse race, the ordering function when executed may divide the simulation into three equal length time segments.

As used herein, the phrase "grouping" means a subset of one or several animated objects. For each race, the ordering function when executed may create two or more groupings, typically three groupings of equal size, and may assign each animated objects to one grouping. The ordering function when executed may divide all the animated objects into groupings according to the betting odds, handicap data, and/or other data elements that relate to the race event participants. For example, in the case of three groupings of equal size, the animated objects with the highest betting odds of winning the race event are assigned to the first grouping, the animated objects with worst betting odds of winning the race event are assigned to the third grouping, and the rest of the animated objects are assigned to the middle grouping.

As used herein, the phrase "frontrunners" is a number of participants and/or animated objects that first arrive at the finish line. For example, if the number of frontrunners is set to three, then the frontrunners are the three animated objects that represent participants that came in first, second, and third place in the race event.

As shown at 103, the media presentation system 200 acquires race results from a betting information server 220 via network 205.

As shown at 105, the media presentation system 200 sends instructions via network 205 to the decoder 240 to present audio and video of the simulation on display 230.

Figure 7:
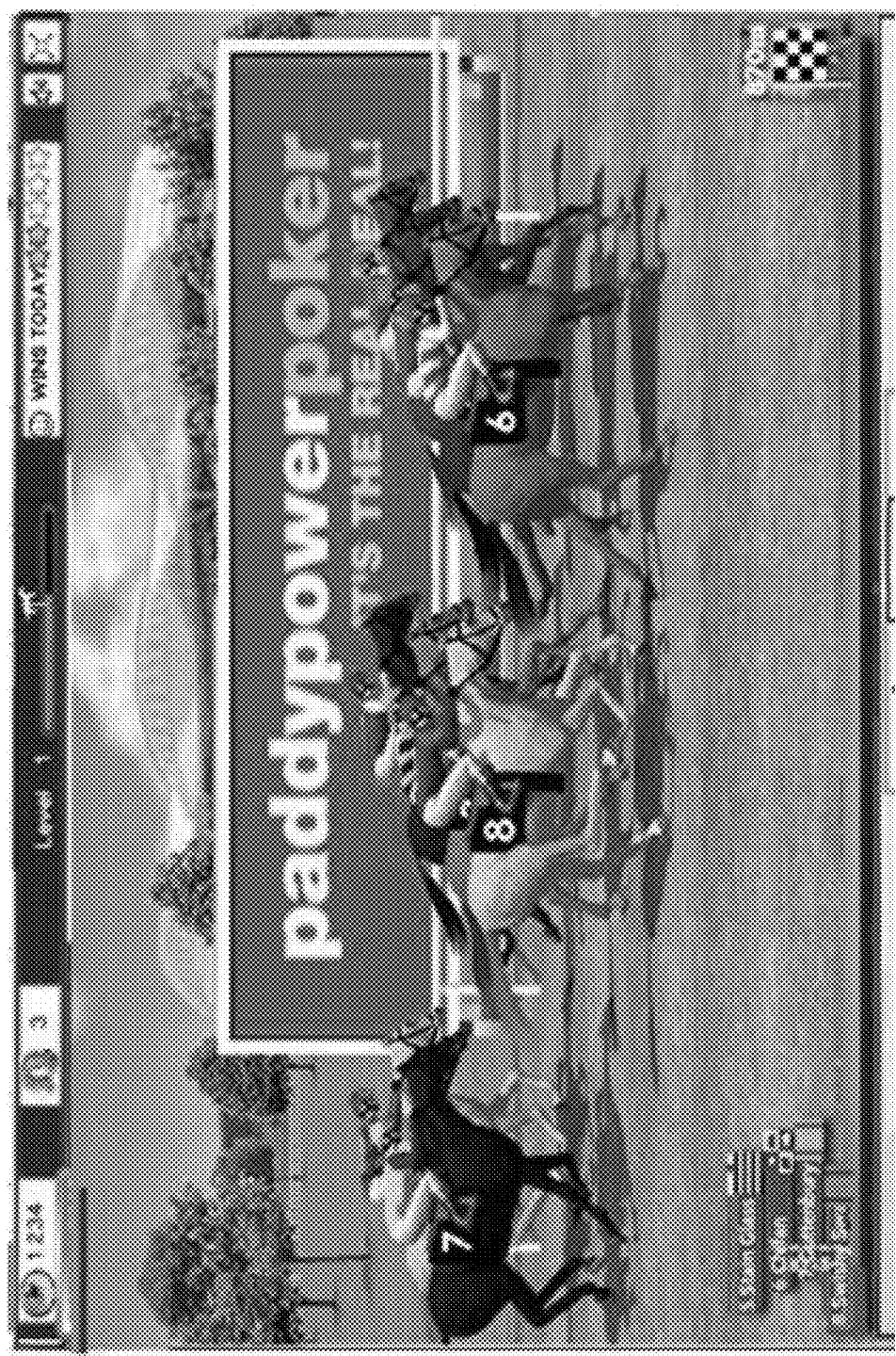
FIG. 7 is an exemplary view of an animated race simulation within a virtual race track, according to some embodiments of the present invention.

Reference is now made to FIG. 7, an exemplary view of an animated race simulation within a virtual race track. Optionally, the race simulation comprises animated objects that are dynamically ordered on a virtual race track in a manner that creates the experience of viewing a race event. The animated objects are all shown to start a race simulation at the starting line, and during the race to move towards the finish line, while the order of animated objects is dynamically changed. When the race ends, the animated objects that win the virtual race are those that correspond to the winning race event participants.

Figure 9:
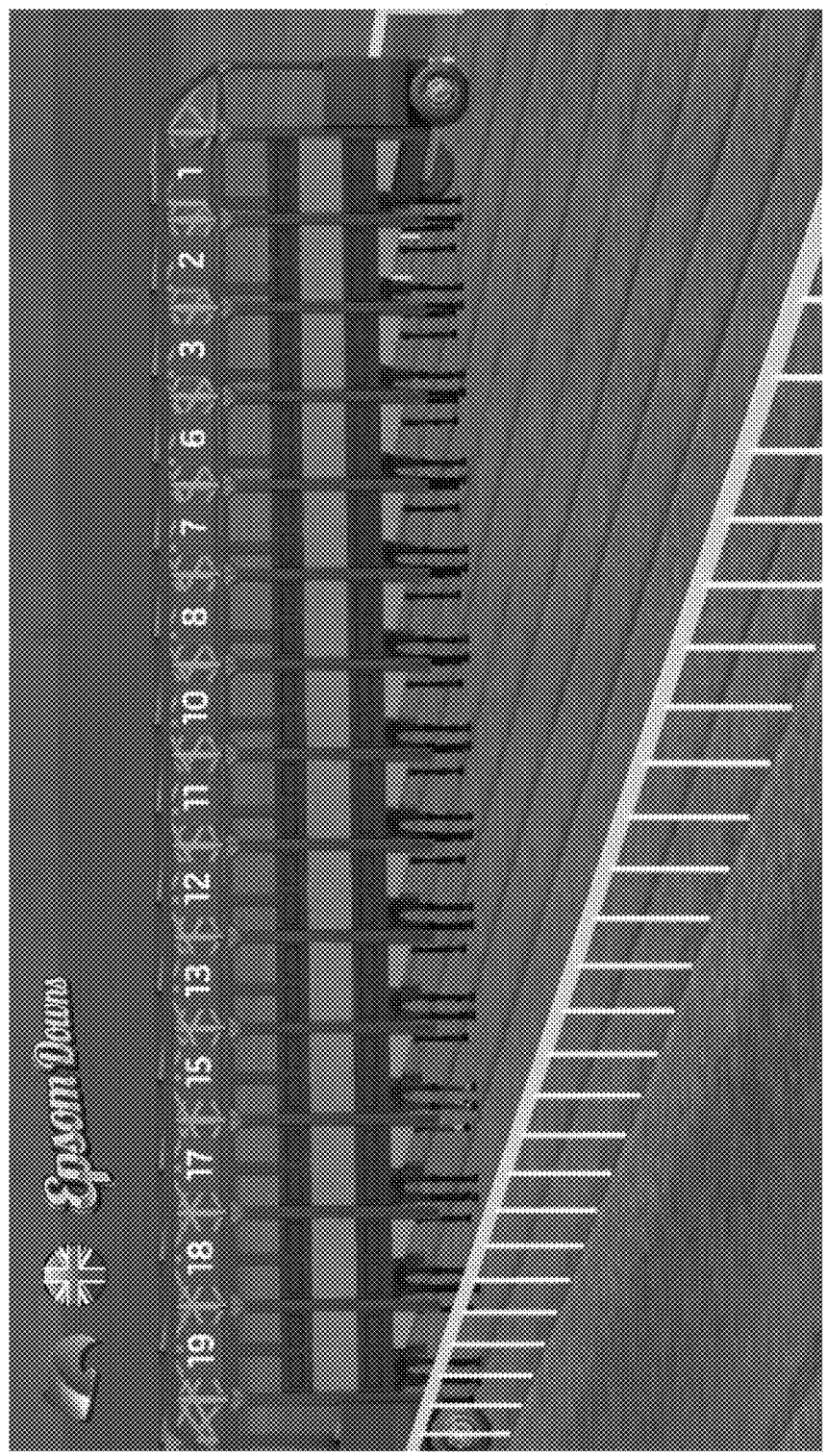
FIG. 9 is an exemplary view of an animated race simulation at the starting line of a virtual race track, according to some embodiments of the present invention.

Reference is now made to FIG. 9 which is an exemplary view of an animated race simulation at the starting line of a virtual race track.

Figure 10:
FIG. 10 is an exemplary view of an animated race simulation forward of the starting line within a virtual race track, according to some embodiments of the present invention.

Reference is now made to FIG. 10 which is an exemplary view of an animated race simulation forward of the starting line of the virtual race track.

Figure 11:
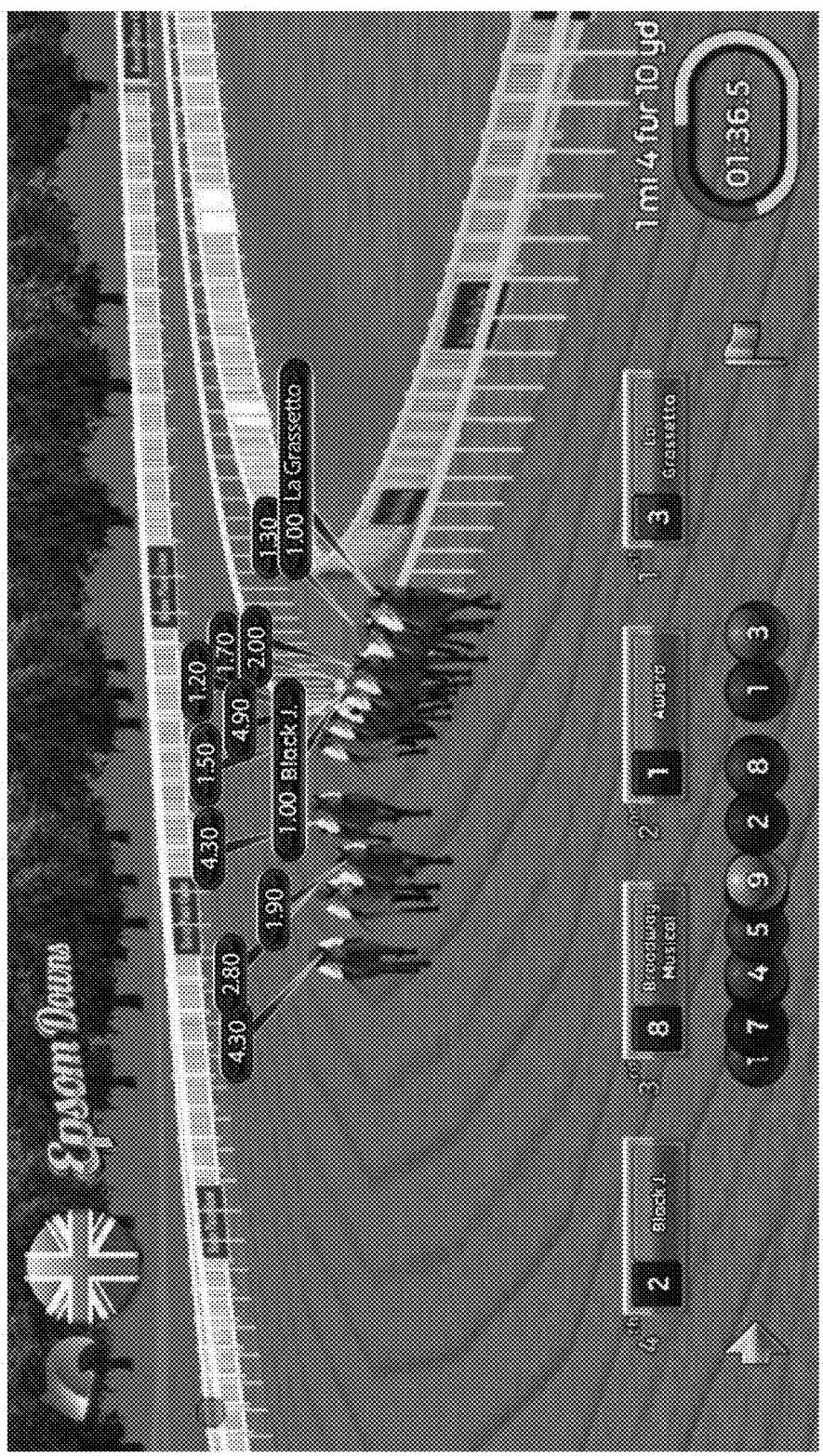
FIG. 11 is an exemplary view of an animated race simulation in a middle section of a virtual race track, according to some embodiments of the present invention.

Reference is now made to FIG. 11 which is an exemplary view of an animated race simulation in a middle section of a virtual race track.

Figure 12:
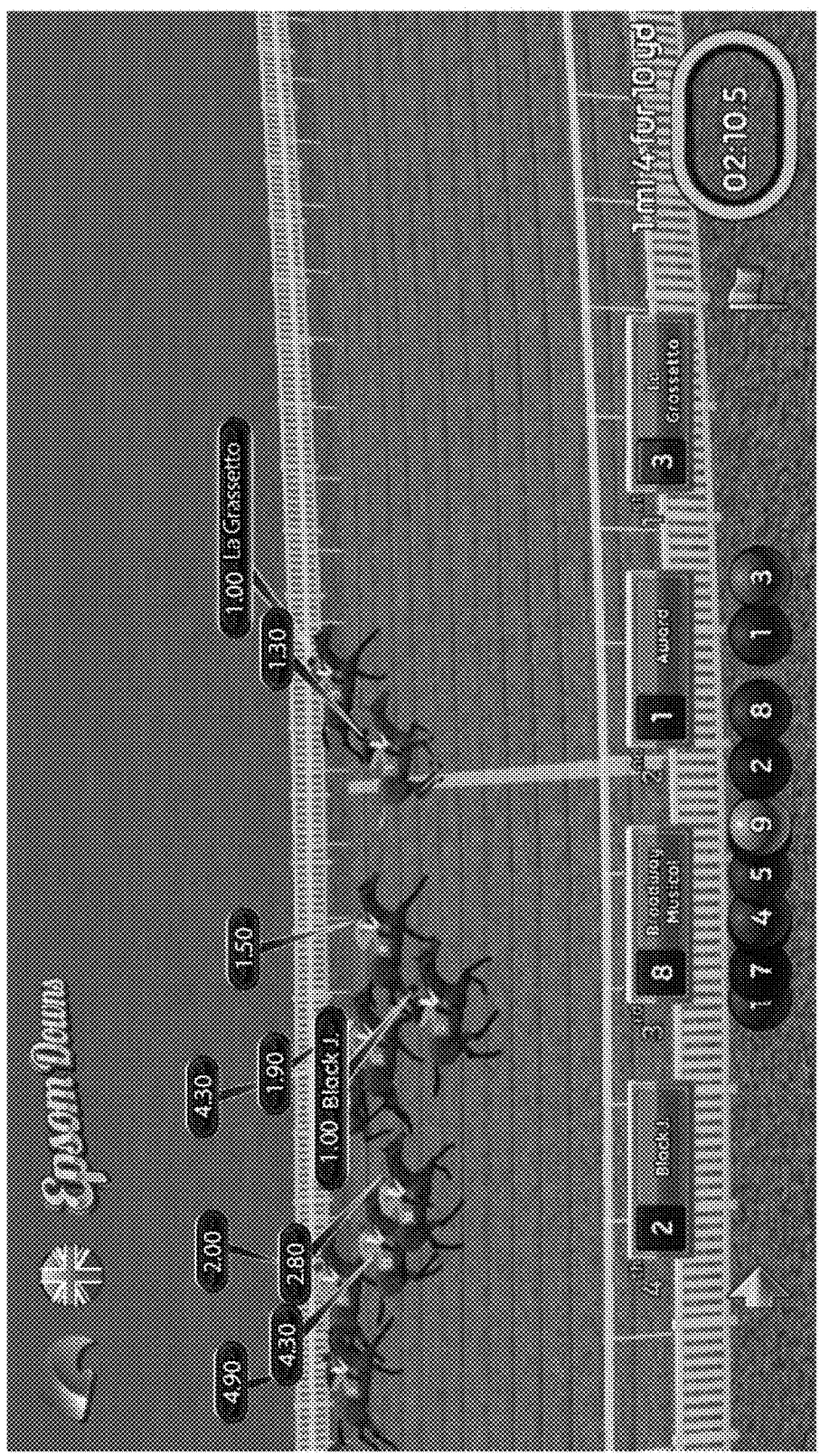
FIG. 12 is an exemplary view of an animated race simulation at the finish line of a virtual race track, according to some embodiments of the present invention.

Reference is now made to FIG. 12 which is an exemplary view of an animated race simulation at the finish line of a virtual race track, wherein the animated objects that win the virtual race are those that correspond to the winning race event participants.

Optionally, the ordering function when executed creates a correlation between every animated object and a participant in a specific race, such that number of animated objects equals the number of participants in the race event. The ordering function when executed further associates the data elements that refer to the race event participants with the corresponding animated object.

Optionally, the ordering function when executed may calculate one or more order change events according to a random variable. For example, during the final segment, the ordering function when executed may calculate order change events wherein a random variable is utilized to determine whether the each of the frontrunners is be moved ahead or behind of each of the other front runners.

Optionally, the ordering function when executed may calculate one or more order change events according to a period of time within the duration of the animated race simulation. For example, an order change event associated with the first time segment may be calculated differently than an order change event associated with a later time segment.

Optionally, the ordering function when executed may calculate one or more order change events according to a location of a participant in a race event relative to the location of other participants and relative to the finish line during the race event. For example, during a race event a specific participant, herein referred to as half way leader, is the first to arrive at half the distance from the start line to the finish line. The ordering function when executed may calculate an order change event wherein the animated object corresponding to the half way leader is the first animated object to arrive at half the distance from the starting line to the finish line of the virtual race course.

Optionally, the ordering function when executed may calculate one or more order change events according to text data comprising a location of a participant in a race event relative to the location of other participants and relative to the finish line during the race event. For example, text data may be received from betting information server 220 and/or another data server that at a certain point in time a first participant is closer to the finish line than a second participant, whereas previously the second participant had been closer to the finish line. The ordering function when executed may calculate an order change event corresponding to the certain point in time wherein the animated object corresponding to the first participant first moves closer to the finish line than the animated object corresponding to the second participant. When a conflict arises between the text data and any other data, for example betting data for participants during the race event or data on the relative performance of the competitors during the race event, the conflict may be resolved by automatically preferring the text data and/or any other mechanism to resolve the conflict.

Optionally, the ordering function when executed may calculate order change events according to the number of race event participants. For example, for a race event with 6 participants the ordering function when executed may create two groupings for the corresponding animated race simulation. For a race event with 21 participants the ordering function when executed may create three grouping for the corresponding race simulation.

Optionally, the ordering function when executed may calculate order change events according to the length of time of the race event. For example, for a race event lasting 30 seconds the ordering function when executed may create two time segments for the corresponding animated race simulation. For a race event lasting 60 seconds the ordering function when executed may create three time segments for the corresponding race simulation.

Optionally, the ordering function when executed may calculate order change events according to handicap data related to race event participants. For example the ordering function when executed may designate as a frontrunner an animated object representing the participant in a race event chosen by a handicapper as most likely to win the race event.

The ordering function when executed may use different algorithms for calculating the order change event for each time segment, and for each grouping within each time segment.

The ordering function when executed may assign to each animated object a handicap value (in the case of a horse race) that corresponds to the handicap value of competition participants, for example the animated object that represents the competition participant that is rated by a handicap to came in first place in a specific competition is assigned a handicap value of "1", the animated object that represents the competition participant that is rated by a handicap to came in second place is assigned a handicap value of "2", etc.

Figure 4:
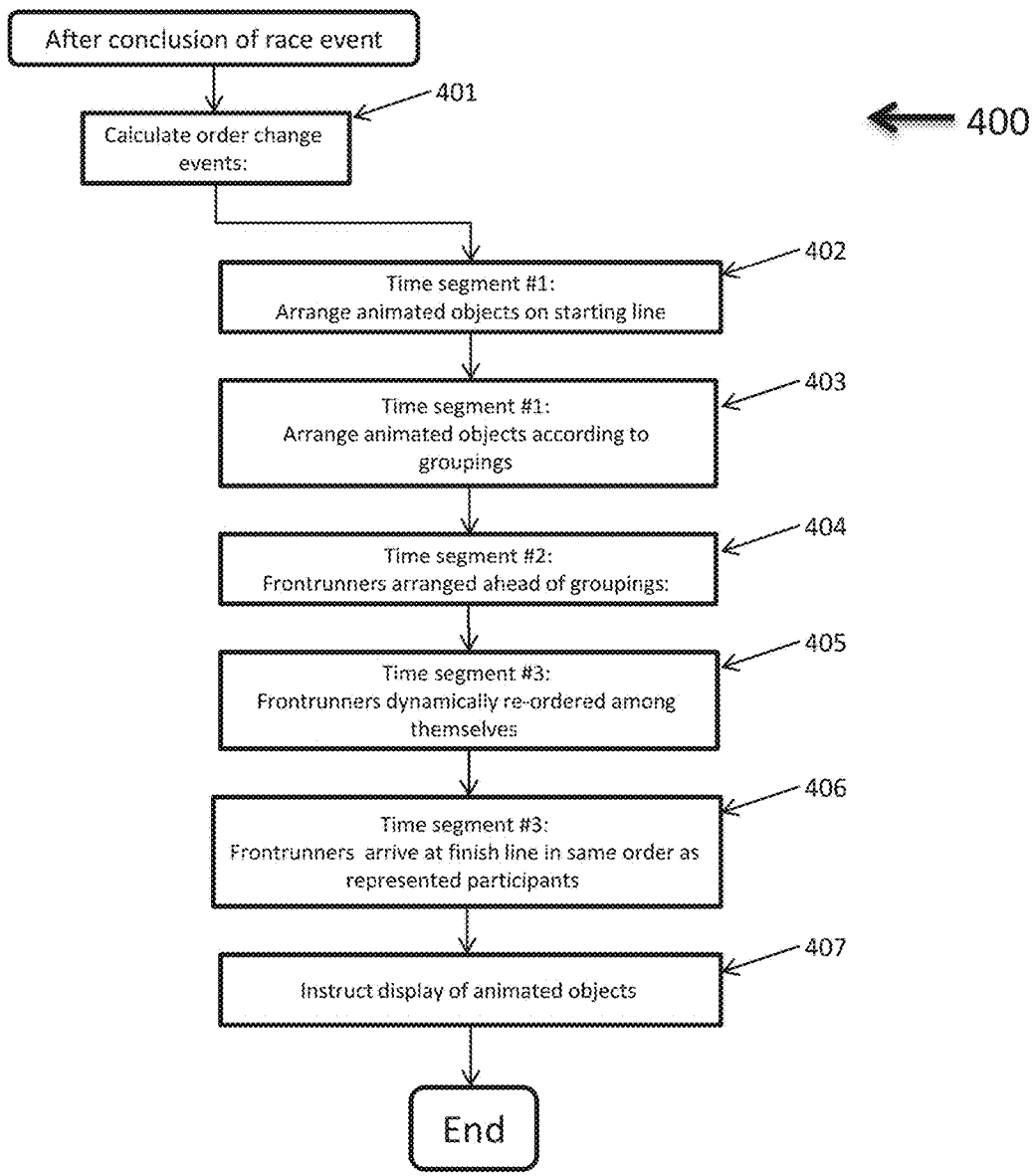
FIG. 4 is a flowchart of a method of calculating a set of order change events for said simulation, according to some embodiments of the present invention.

After the data elements described above are acquired to the ordering function when executed, the ordering function when executed divides the animated objects into groupings based on betting odds, and then calculates a plurality of order change events, as shown in FIG. 4.

Reference is now made to FIG. 4 which is a flowchart 400 of an exemplary method of the ordering function when executed to calculate a single specific order change event, for example as depicted in 301 and 104.

As shown in 401, after the race event has concluded the ordering function when executed calculates the order change events according to the number of groupings and time segments. In the exemplary case of 400, the number of time segments is three and the number of groupings is three.

As shown in 402, at the start of the time segment one, all of the animated objects are arranged at the starting line. As shown in 403, during the first time segment, all of the animated objects advance towards the finish line. The grouping with the betting odds favored to win the race event is moved ahead of the other two groupings, and the grouping with the betting odds least favored to win is moved behind the other two groupings.

Optionally during the first time segment, the order of the animated objects within each grouping may be dynamically changed according to a random variable, and/or according to other data elements, for example handicap data and/or data on the relative performance of the competitors during the race event.

As shown in 404 during the second time segment, the three frontrunner animated objects, are moved ahead of all the other animated objects.

Optionally during the second time segment, the animated objects within each grouping are ordered according to their betting odds, with the animated objects with betting odds most favored to win are moved to the front of each grouping.

As shown in 405, during the third time segment, the three animated objects corresponding to the three frontrunners are dynamically reordered among themselves, but remain at the front of the race.

Optionally during the third time segment, the order of the animated objects within each grouping may be dynamically changed according to a random variable and/or according to other data elements, for example handicap data and/or data on the relative performance of the competitors during the race event.

As shown in 406, the final seconds of the race are calculated. The animated object that represents the race event participant that came in first place in the race event, herein referred to as the first frontrunner, is moved in front of the other animated objects. The animated object that represents the race event participant that came in second place in the race event, herein referred to as the second frontrunner, is moved close behind the first frontrunner. The animated object that represents the race event participant that came in third place in the race event, herein referred to as the third frontrunner, is moved close behind the second frontrunner. The first frontrunner crosses the virtual finish line before the other animated objects. The next animated object to cross the virtual line is the second frontrunner. The third animated object to cross the virtual finish line is the third frontrunner. The other animated objects cross the finish line in the order of their groupings.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant computing, networking, streaming, and animation technologies will be developed and the scope of the terms computer, networking, streaming, and animation are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for generating instructions to display an animated simulation of a race event, comprising:
    before an end of a race event involving a plurality of real participants that compete with each other acquiring betting information indicative of current betting odds given to said plurality of real participants of said race event, said acquiring is performed at a server sent from a data source over the Internet, the server comprising at least one processor and a memory that stores a code, wherein the at least one processor executes said code for:
    calculating, before said end of said race event, a plurality of order change events according to said betting information;
    acquiring results of said race event over the Internet in real time;
    generating instructions to change an order of a plurality of animated objects in an animated simulation of said race event displayed on a display of a client terminal according to said plurality of order change events, each said animated object represents one of said plurality of real participants in said race event;
    wherein said animated simulation is displayed during said race event;
    wherein said generating comprises generating instructions to emulate an arrival of at least some of said plurality of real participants at an ending point according to said results;
    wherein said results comprises an order of arrival of said plurality of real participants at a finish line of said race event.

2. The method of claim 1, wherein said animated simulation comprises a graphical representation of a race course comprising a beginning point, an ending point, and a path from said beginning point to said ending point, wherein at least some of said plurality of animated objects begin said animated simulation at said beginning point, follow said path, and arrive at said ending point at the end of said animated simulation.

3. The method of claim 2, wherein said order change event defines a location of each said animated object relative to every other said animated objects and relative to said ending point.

4. The method of claim 1, wherein said order change events are indexed in an array, wherein said order change events are displayed sequentially according to said index.

5. The method of claim 1, wherein said betting information comprises betting odds on at least one of said plurality of real participants, said betting odds are acquired via a network from at least one server of a member of a group consisting of: a bookmaker, a race event establishment, and other betting exchanges.

6. The method of claim 1, wherein said betting information further comprises at least one of para-mutual odds and fixed odds.

7. The method of claim 1, wherein said betting information comprises a plurality of transactions wherein payment is accepted in exchange for a promise of a compensation conditioned on performance of at least one of said plurality of real participants in said race event.

8. The method of claim 1, wherein said race event is a horse race wherein said betting information comprises horse race betting odds on said plurality of real participants in said race event, comprising odds for win, place, show, across the board, trifecta, trifecta box, trifecta key, exacta, exacta box, superfecta, superfecta box, superfecta key, or any other type of horse race betting odds.

9. The method of claim 1, wherein said order change event is calculated responsive to a data element comprising a random variable.

10. The method of claim 1, wherein said order change event is calculated responsive to a data element comprising a period of time within a duration of said simulation.

11. The method of claim 1, wherein said order change event is calculated responsive to a location of a respective said real participant in said race event relative to other of said plurality of real participants and relative to a finishing line in said race event.

12. The method of claim 11, wherein said order change event is calculated responsive to text data comprising a location of a respective said real participant in said race event relative to other of said plurality of real participants and relative to said finishing line in said race event.

13. The method of claim 1, wherein said order change event is calculated responsive to at least one of the following: a number of said plurality of real participants, and a length of time of said race event.

14. The method of claim 1, wherein said race event is a horse race and said order change event is calculated responsive to a data element comprising handicap data for said plurality of real participants.

15. A system for performing an animated simulation display of a race event, comprising:
   a server comprising at least one interface adapted to acquiring over the Internet betting information indicative of current betting odds given to a plurality of real participants that compete with each other at a race event, wherein said server acquires said betting information before an end of said race event; and
   at least one processor;
   a memory hosting code, wherein said code is executed by said at least one processor for:
   calculating, before said end of said race event, instructions to update a plurality of order change events according to said betting information,
   acquiring results of said race event over the Internet in real time; and
   generating instructions to change an order of a plurality of animated objects in an animated simulation of said race event displayed on a display of a client terminal according to said plurality of order change events, each said animated object represents one of said plurality of real participants in said race event;
   wherein said generating comprises generating instructions to emulate an arrival of at least some of said plurality of real participants at an ending point according to said results;
   wherein said results comprises an order of arrival of said plurality of real participants at a finish line of said race event;
   wherein said at least one interface is adapted to send said instructions to a browser or an application executed on said client;
   wherein said animated simulation is displayed during said race event.

16. The system of claim 15, wherein said order change event defines a location of each said animated object relative to every other said animated objects and relative to an ending point.

17. The system of claim 15, wherein said betting information comprises betting odds on at least one of said plurality of real participants, said betting odds are acquired via a network from at least one server of a member of a group consisting of: a bookmaker, a race event establishment, and other betting exchanges.

18. A computer program product for computing a simulation of a race event, the computer program product comprising:
   one or more non-transitory computer-readable storage mediums, and program instructions stored on at least one of the one or more storage mediums, the program instructions comprising:
   program instructions for acquiring betting information indicative of current betting odds given to a plurality of real participants that compete with each other at a race event, said acquiring is performed before an end of said race event at a server sent from a data source over the Internet, the server comprising at least one processor and a memory that stores a code, wherein the at least one processor executes said code;
   program instructions for calculating a plurality of order change events according to said betting information and before said end of said race event;
   program instructions for acquiring results of said race event over the Internet in real time; and
   program instructions for generating instructions to change an order of a plurality of animated objects in an animated simulation of said race event displayed on a display of a client terminal according to said plurality of order change events, each said animated object represents one of said plurality of real participants in said race event;
   wherein said generating comprises generating instructions to emulate an arrival of at least some of said plurality of real participants at an ending point according to said results;
   wherein said results comprises an order of arrival of said plurality of real participants at a finish line of said race event;
   wherein said animated simulation is displayed during said race event.

* * * * *